US011151900B2

(12) United States Patent
Spano

(10) Patent No.: US 11,151,900 B2
(45) Date of Patent: Oct. 19, 2021

(54) METHOD AND APPARATUS FOR GENERATING VOICE GUIDANCE IN A RACE VEHICLE

(71) Applicant: RaceVoice LLC, East Longmeadow, MA (US)

(72) Inventor: Steve Spano, Dryden, NY (US)

(73) Assignee: RaceVoice LLC, Longmeadow, MA (US)

( * ) Notice: Subject to any disclaimer, the term of this patent is extended or adjusted under 35 U.S.C. 154(b) by 0 days.

(21) Appl. No.: 16/658,925

(22) Filed: Oct. 21, 2019

(65) Prior Publication Data

US 2020/0126448 A1 Apr. 23, 2020

Related U.S. Application Data

(60) Provisional application No. 62/748,796, filed on Oct. 22, 2018, provisional application No. 62/749,093, filed on Oct. 22, 2018.

(51) Int. Cl.
*G06F 3/16* (2006.01)
*G09B 19/16* (2006.01)
*G06F 3/0482* (2013.01)

(52) U.S. Cl.
CPC ........... *G09B 19/167* (2013.01); *G06F 3/165* (2013.01); *G06F 3/0482* (2013.01)

(58) Field of Classification Search
None
See application file for complete search history.

(56) References Cited

U.S. PATENT DOCUMENTS

| 6,972,665 | B2 | 12/2005 | Wang et al. |
| 9,302,630 | B2 | 4/2016 | Cech |
| 9,520,061 | B2 | 12/2016 | Cech et al. |
| 9,653,001 | B2 | 5/2017 | Mughal et al. |
| 9,718,476 | B2 | 8/2017 | Lonski |
| 2008/0254746 | A1* | 10/2008 | Krishnan ................ G10L 15/26 |
|  |  |  | 455/66.1 |
| 2017/0039870 | A1* | 2/2017 | Ellis .......................... G09B 9/04 |

FOREIGN PATENT DOCUMENTS

CN 107458381 A 12/2017

* cited by examiner

*Primary Examiner* — Bruk A Gebremichael
(74) *Attorney, Agent, or Firm* — Moser Taboada

(57) ABSTRACT

A method and apparatus for generating voice guidance in a race vehicle while the race vehicle is racing on a race track, comprises receiving, at a voice guidance system (VGS) from a data system (DS) of the race vehicle, status information regarding the race vehicle. Based on the status information, a guidance data for the race vehicle is determined at the VGS, and a voice data of the guidance data is communicated from the VGS to an audio actuator located in the race vehicle. The voice actuator annunciates a voice prompt based on the voice data in the race vehicle.

14 Claims, 4 Drawing Sheets

METHOD AND APPARATUS FOR GENERATING VOICE GUIDANCE IN A RACE VEHICLE

CROSS-REFERENCE TO RELATED APPLICATIONS

The present application claims priority to the U.S. Provisional Application Nos. 62/748,796 and 62/749,093, both filed on Oct. 22, 2018, and each of the above applications is incorporated by reference herein in its entirety.

BACKGROUND

Field

The invention relates generally to a method and apparatus to assist a race vehicle driver, and more particularly, to generating voice guidance in the race vehicle when the race vehicle is racing on a race track.

Description of the Related Art

Vehicle racing is a popular activity, in which a vehicle races against other similar or dissimilar vehicles, or against the clock. Race vehicles include cars, bikes, karts, drag race cars, trucks, boats, among others. In a race car, various performance information is typically available from a dashboard or from a pit crew member radioing information to the driver. In car diagnostic and performance data may be displayed on a dashboard display. However, to view the display, a driver of the race car must take his or her eyes off the track, shift gaze at the display, and while driving at high speeds (typical in a racing environment), the driver is required to comprehend what is being displayed, and act reasonably quickly. The amount of data to be absorbed by the driver can be overwhelming, and in general, the driver of a race vehicle is required to process a substantial amount of information while driving at high speeds. As such, most drivers select only critical data for display, e.g., shift warning lights, high temperature warning, oil pressure warning, and so on.

Modern data acquisition systems (DAS) or data systems used in vehicles today are capable of extracting a wealth of information, however, such information is not readily usable by the driver because the driver must focus on the racing and has a limited visual attention bandwidth to devote to the dashboard display of the vehicle.

Accordingly, there exists a need for improvement in the manner in which race vehicle information is presented to the driver of the race vehicle during a race.

SUMMARY

Embodiments of the present invention generally relate to a method and apparatus for generating voice guidance in a race vehicle, substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
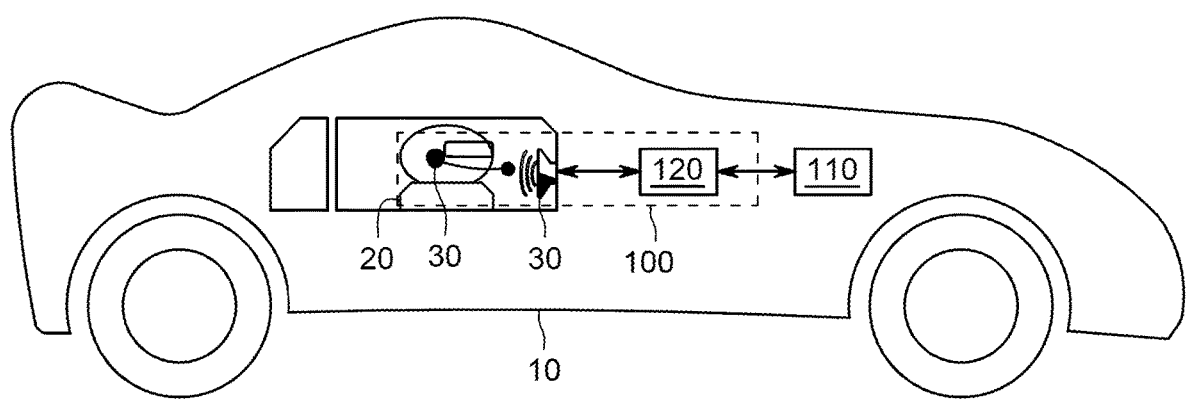
FIG. 1 is a diagram of a race car comprising an apparatus for generating voice guidance, according to an embodiment of the invention.

Embodiments of the present invention relate to method and apparatus for generating voice guidance in a race vehicle, while the race vehicle is racing on a race track. The apparatus comprises a voice guidance system (VGS) coupled to a data system (DS) of the race vehicle. The data system includes sensors and other equipment to measure various parameters of the race vehicle, for example, speed, acceleration, location, time elapsed, g-force, steering angle, throttle position, brake position, brake displacement, temperature, pressure, aerodynamics, a state of the engine, driver performance data and other information concerning the race vehicle, while the race vehicle is racing on the race track. The voice guidance system (VGS) is configured to determine guidance data based on the parameter(s) obtained from the data system, race track information, previous racing information of the race vehicle, previous racing information of a driver of the race vehicle. The voice guidance system may present any of this information and an audio announcement to the driver via an audio actuator located in the racing vehicle, for example, a speaker, an earphone or a headset.

Prior to beginning racing, the VGS is configured to generate voice prompts for desired guidance. The VGS presents a list of selectable guidance options to a user configuring the VGS, for example, a driver of the race car, a coach of the driver, pit crew or other assistant personnel. For example, the VGS presents a selectable list of guidance options in a user interface to the user. Based on the selected guidance(s), when the racing vehicle is racing on the race track, relevant inputs from the information received from the data system are used by the VGS to generate a voice output in the race vehicle, thereby providing the selected guidance to the driver.

For example, a race vehicle driver may request guidance by selecting to monitor exit speed at the time the race vehicle exits a selected corner, or every corner of a race track. The VGS monitors for and receives, from the data system, the speed of the race vehicle and the location of the race vehicle (e.g. a corner, a turn-in or an exit). Based on the monitored inputs, the VGS determines the desired guidance, that is, the speed of the race vehicle at an exit of a corner in the race track. The VGS generates, based on the determined guidance, voice data which is then used by an audio actuator to generate the corresponding voice prompt. So, in this example, at the exit of the selected corner where the speed was 125 mph, the voice guidance system will announce the exit speed, e.g., "125 miles per hour," as the racing vehicle exits the corner. With such real-time feedback, the driver can strive to improve performance on each successive lap. As used herein, the term "real time" means as soon as possible given the processing constraints, unless indicated otherwise. Further, the voice guidance system may store the received information for the driver to review after the driving session. In a similar manner, several other parameters may be monitored, the desired guidance data generated, and announced as a voice prompt in the racing vehicle while the vehicle is racing on the race track. The desired guidance includes, but is not limited to, corner entry speed, lap time, engine oil pressure, coolant temperature, maximum speed, corner G-force, speed or RPMs at any point on the racetrack, among others.

For ease of explanation, the following embodiments are further explained with respect to an example of a race car, however, the present invention and application thereof is not limited to a race car. In other embodiments, the present invention includes methods and apparatus applied to other race vehicles, including, but not limited to bikes, karts, drag race cars, trucks, boats, motorcycles, among others, and such embodiments would occur readily to those of ordinary skill as being within the scope of the present invention. In general, any vehicle that can be adapted to race either against other vehicles, or against the clock, may find use for embodiments of the present invention described herein.

FIG. 1 is a schematic diagram of a race car 10 comprising an apparatus 100 for generating voice guidance in race vehicle, according to an embodiment of the invention. The race car 10 has a driver 20 driving the car 10 on a race track (not shown in FIG. 1). The apparatus 100 comprises a voice guidance system (VGS) 120, and an audio actuator 30 located in the car 10 to be clearly audible to the driver 20. For example, the audio actuator 30 includes a speaker close to the driver, or an earphone/ear piece/headset worn by the driver, for example, within a helmet. A data system 110 of the race car 10 is communicably coupled to the VGS 120, and the VGS 120 is communicably coupled to the audio actuator 30.

In some embodiments, the apparatus 100 includes a dedicated audio actuator 30, for example earbuds, a headset, or a loudspeaker, which are separate from any existing audio system present in the race vehicle. In some embodiments, the apparatus 100 can be connected to the race vehicle's existing audio system via an audio bridging adapter or a 'Y' cable, as generally known in the art. The existing audio systems may usually include two-way radio in the car, for example, a headset in the driver's helmet, to communicate with members of the racing crew while racing in the race vehicle. Upon connecting with the apparatus 100, for example, by using the headset of the existing audio system as the audio actuator 30, the voice commands generated by the apparatus 100 are connected to a single headset in the driver's helmet. In this manner, the apparatus 100 and the existing two-way communication system are made compatible, and can be used simultaneously. As an example of a race crew and the apparatus 100 configured to share the existing audio system (loudspeaker/headset/earbuds), a race crew member announces "GREEN" via the existing audio system when the green flag waves to start the race, and on the same audio channel the apparatus 100 then announces "accelerate to 80 mph," or another such voice guidance as may be configured in the apparatus 100.

In some embodiments, the data system 110 and the VGS 120 are separate systems coupled communicably. In some embodiments, the data system 110 and the VGS 120 are integrated into a single unit. If integrated into a single unit, a portion of the unit forms the data system 110 and another portion of the same unit forms the VGS 120. Both systems may be integrated onto a single circuit board or semiconductor chip set.

Figure 2:
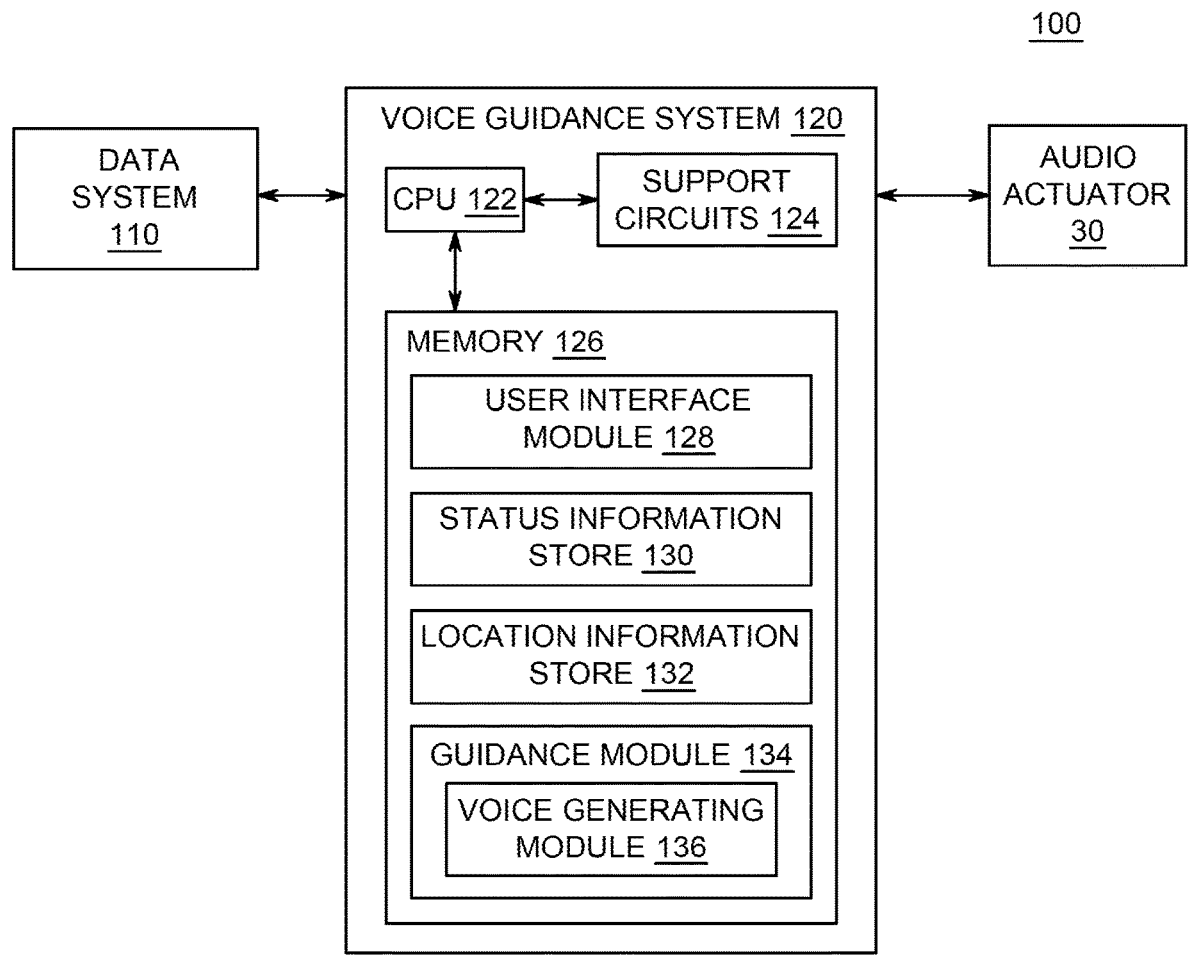
FIG. 2 is a block diagram of the apparatus of FIG. 1, according to an embodiment of the invention.

FIG. 2 is a block diagram of the apparatus 100 of FIG. 1, according to an embodiment of the invention. The data system 110, also referred to as vehicle data acquisition system, is well-known in the art, and generally comprises several sensors for monitoring status of various parameters of the vehicle, for example, one or more of speed, acceleration, location, time elapsed, lateral g-force, linear g-force, steering angle, throttle position, brake position, brake displacement, temperature, pressure, rotations per minute (RPM), aerodynamics, pitch, yaw, air to fuel ratio, shock absorber position, among various others as known in the art.

The VGS 120 comprises a CPU 122, support circuits 124 and a memory 126. The CPU 122 may be any commercially available processor, microprocessor, microcontroller, and the like. The support circuits 124 comprise well-known circuits that provide functionality to the CPU such as a user interface, clock circuits, network communications, cache, power supplies, I/O circuits, and the like. In some embodiments, the user interface comprises a keypad, electronic buttons, speaker, touchscreen, display, or other user interaction mechanism. The memory 126 may be any form of digital storage used for storing data and executable software. Such memory includes, but is not limited to, random access memory, read only memory, disk storage, optical storage, and the like. The memory 126 stores computer readable instructions corresponding to an operating system (not shown), a user interface module 128, a status information store 130, a location information store 132, a guidance module 134 and a voice generating module 136.

The user interface module 128 generates and provides a user interface (UI, not shown), such as a menu comprising a list of selectable guidance options corresponding to available guidance, information or parameters about the car, such as, weight of the car, wheelbase, tire width/height, among others. Prior to racing, a user (driver, coach, support staff) of the race car is presented the UI with the list of available guidance options. The UI module 128 may interface with a laptop, tablet or other form of computer to display the menus for manipulation by a user. As such, the computer is coupled to the module 128 via a USB or other data interface. The user selects a desired guidance to be provided to the driver as the car is driven on the race track. The guidance options may comprise various guidance information useful for a race car driver, and includes information derived from one or more parameters, such as that received from the data system 110, for example, speed, acceleration, location, time elapsed, g-force, steering angle, throttle position, brake position, brake displacement, temperature, pressure, rotations per minute (RPM), aerodynamics, among several others as known in the art, for particular locations of the race track. In some embodiments, the guidance information includes information derived from two or more parameters obtained from the data system 110. In this manner, the driver receives specific guidance needed for improving performance and/or safety while driving the race car on the race track.

The status information store 130 stores the status data of various parameters of the car received from the data system 110, and other guidance data derived from the parameters. The location information store 132 stores the location information of the car on the race track at any given time. In some embodiments, the location of the car on the race track may be received from the data system 110, which includes a location tracking system, for example, a global positioning system (GPS) system, and a map of the race track. In some embodiments, one or more of the location tracking system or the map of the race track is included in the VGS 120. The data system 110 is typically set up to generate tables of information regarding car and driver performance. The information is communicated in real-time to the VGS 120, where only a subset of the available information is selected (filtered), analyzed as needed, and annunciated to the driver.

The guidance module 134 receives the car status and the location information, and based on the guidance established by the driver, the guidance module generates a voice data output, for example, using the voice generating module 136. The voice data output is an audio output which may be sent to an audio actuator for being announced to the driver in real-time, while the driver is driving the car. The guidance module 134 may also store the guidance data in the status information store 128 and the location information store 132, for later review, for example, by the driver or other users. The voice generating module 136 may include pre-recorded audio corresponding to possible guidance alerts, or may include a text-to-speech (TTS) engine to generate voice guidance from text provided by the data system 110.

In some embodiments, the guidance module 134 analyzes one or more of the race car parameter information provided by driver via the user interface (e.g., weight of the car, wheelbase, tire width/height, among others), or status data obtained from the data system 110 (e.g., lateral/linear g-force, pitch/yaw, mph, and throttle position). In some embodiments, the guidance module 134 analyzes at least two parameters from the race car parameter information input, and the status data obtained from the data system 110. Based on the analysis, the guidance module 134 calculates optimal performance parameters if selected by the user initially. For example, the guidance module 134 may calculate an optimum traction circle for the race car, the optimal rate of increase of the throttle, availability of more throttle, among other similar operational characteristics of the race car. In some embodiments, the guidance module 134 learns when the race car is racing on the race track, for example, using machine learning and/or artificial intelligence techniques using one or more of statistical, mathematical or neural-network based models. In some embodiments, the guidance module 134 uses the machine learning and/or artificial intelligence techniques to analyze the data input by the driver via the UI, the car data provided by the data system 110, and based on the analysis, generates, voice guidance for the driver in real time, which is then announced to the driver using the voice actuator 30. In this manner, the guidance module 134 is capable of processing data generating announcements based on processed data values.

As an example, if a driver is learning to drive on a "Traction Circle," the guidance module 134 analyzes the lateral/linear g-force, pitch/yaw, speed, and throttle position obtained from the race car data system 110; and weight of the car, wheelbase, tire width/height obtained via the UI. The guidance module 134 calculates in real time, for example, when the driver is driving the car on a particular section of the track, what the optimum traction circle for the car should be, what the rate of increase of the throttle is, and calculates and announces if more throttle is available.

Embodiments described with respect to FIGS. 1 and 2 depict a race car 10 having a built-in data system 110, which interacts with the voice guidance system 120. In some embodiments (not shown), one or more components of the data system are included in the voice guidance system. For example, where the race car or another vehicle does not include a data system similar to the data system 110, the voice guidance system 120 includes one or more components to accomplish functionalities of the data system 110, such as acquiring operational and performance data of the vehicle.

Figure 3:
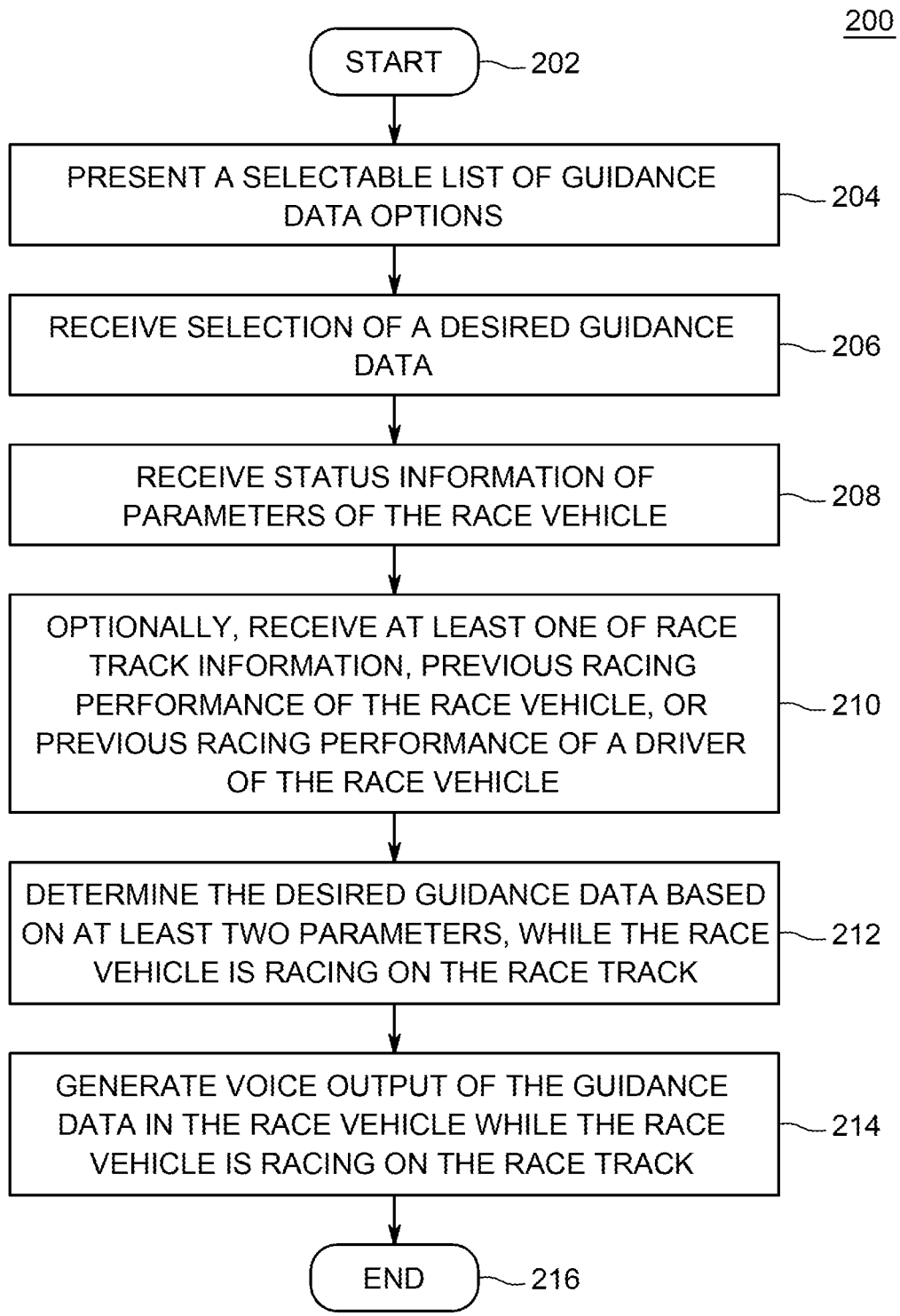
FIG. 3 is a flow diagram of a method for generating voice guidance implemented by the apparatus of FIG. 1 or FIG. 2, according to an embodiment of the invention.

FIG. 3 is a flow diagram of a method 200 for generating voice guidance implemented by the apparatus 100 of FIG. 1 or FIG. 2, according to an embodiment of the invention. The method 200 starts at step 202, and proceeds to step 204, at which, the VGS 120 presents a selectable list of available guidance data. For example, prior to beginning of a race, a user (e.g., driver, coach, pit staff) of the race vehicle, such as the race car 10, accesses the list using the VGS 120 (and/or a laptop/tablet (computer) connected thereto). The computer is disconnected from the VGS 120 during use on the race track. The method 200 proceeds to step 206, at which the VGS 120 receives a selection of one or more desired guidance data. For example, the user may select the desired guidance data option(s) from the list of available guidance data options for the race vehicle, establishing the guidance desired by the driver. The guidance options include, without limitation, entry or exit speed at a specific location on the race track (for example, curved portions of the track), comparative information with previous racing performance(s), lateral or linear g-force at a specific location on the race track, speed through a section of the race track, minimum speed in a predefined segment of the track, instantaneous speed in a predefined segment, among others. As such, the guidance may include any number of parameters of the car, or a combination thereof, such as speeds at specific locations, time taken to traverse through a portion of the track, information of car's systems during specific portions of the track or after specific time lapse, among several others as would be apparent to those of ordinary skill in the art of car racing. The apparatus 100 is thereon configured for generating voice guidance in the race vehicle 10, while the race vehicle is racing on the race track, according the desired guidance established at steps 204 and 206.

At step 208, the VGS 120 receives the status information of the race vehicle, for example, from the data system 110 of the race vehicle 10. At step 210, the VGS receives information on the race track, the racing performance of the race vehicle in a previous race, or the racing performance of a driver of the race vehicle in a previous race. In some embodiments, information received at step 210 is optional. In some embodiments, information received at step 210 is pre-stored in the VGS 120. For example, the information about the race car 10 (e.g., weight of the car, wheelbase, tire width/height, among others), race track, previous racing performance of the race vehicle or the driver is provided to the VGS 120 by the user prior to the racing.

At step 212, the VGS 120 determines the guidance, for example, as selected by the user at step 206, based on the status information of the parameters of the race vehicle, information about the race car, race track, or previous racing performance of the race vehicle and/or the driver. For example, for guidance selection "entry or exit speed at a specific location on the race track" (for example, curved portions of the track), the VGS 120 tracks the location of the race vehicle on the race track, and when the vehicle reaches the specified location on the race track, the VGS 120 determines the speed (received from the data system 110) at the specified location as the guidance data. The VGS 120 converts the guidance data to voice data, for example, converting text-to-speech, or from a repository of pre-recorded voice prompts corresponding to possible guidance data.

For guidance selection "lateral or linear g-force at a specific location on the race track," the VGS 120 tracks the location of the race vehicle on the race track, and when the vehicle reaches the specified location on the race track, the VGS 120 determines the g-force (received from the data system 110) at the specified location as the guidance data. The VGS 120 then converts the guidance data to voice data for announcement.

For guidance selection "comparative information with previous racing performance(s)," the VGS 120 identifies a portion of the race track in a previous performance of interest to the driver or other users, and the time taken by the race vehicle to cover the portion. The VGS 120 then tracks the location of the race vehicle on the race track and identifies the time elapsed in covering the same portion of the race track. Thereafter, the VGS 120 calculates the difference between the times of the previous racing performance and the current performance of the race vehicle as measured by the data system 110. The calculated difference in time is determined as the guidance data, which is converted to voice data for announcement. For example, a speed of 65 mph is set as a reference value (for example, from a previous race, or otherwise predefined) for a particular portion of the race track. The difference between the reference value and the speed attained in that portion of the race track is the guidance data, which is then converted to voice data for announcement. If the speed attained is 68 mph, then the guidance data and the voice data correspond to an announcement of "PLUS 3," and if the speed attained is 64 mph, then the guidance data and the voice data correspond to an announcement of "MINUS 1."

For guidance selection "speed through a section of the race track," the VGS 120 identifies the section of the race track using the start and end locations of the section, and further tracks the elapsed time between when the race vehicle is at the start location of the section and the end location of the section. When the race vehicle reaches the end location of the section, the VGS 120 determines the elapsed time as the guidance data, which is converted to voice data for announcement.

In general, for guidance selection related to various parameters, the apparatus 100 starts tracking such parameters continuously upon entering (passing an entry point of) a predefined portion of the race track, till the race car exits (passes an exit point of) the predefined portion, where the location is tracked or defined using GPS or other similar location systems known in the art. In the example where the parameter is speed, using the continuously tracked speed during the predefined portion of the race track, the apparatus 100 can determine and announce a number of parameters, such as the minimum speed, maximum speed, entry speed, exit speed, and the like. Similarly, the apparatus 100 is capable of processing parameters other than speed, including, but not limited to, time, acceleration, g-force, among others.

At step 214, a voice output is generated in the race vehicle while the vehicle is racing on the race track. For example, the voice data generated by the VGS 120 based on the guidance data at step 212 is sent to the audio actuator 30, which plays or annunciates the voice data in the race vehicle, such that the voice is audible to the driver of the race car. The voice output is commensurate with the requested guidance. For example, the voice output announces the status of specific guidance options selected by the driver at step 206, such as speed at a specific location, g-force while negotiating a curve, maximum speed reached on a portion of a track, time taken to cover a portion of a track or an entire lap, among several others.

The method 200 then proceeds to step 216, at which the method 200 ends.

Figure 4:
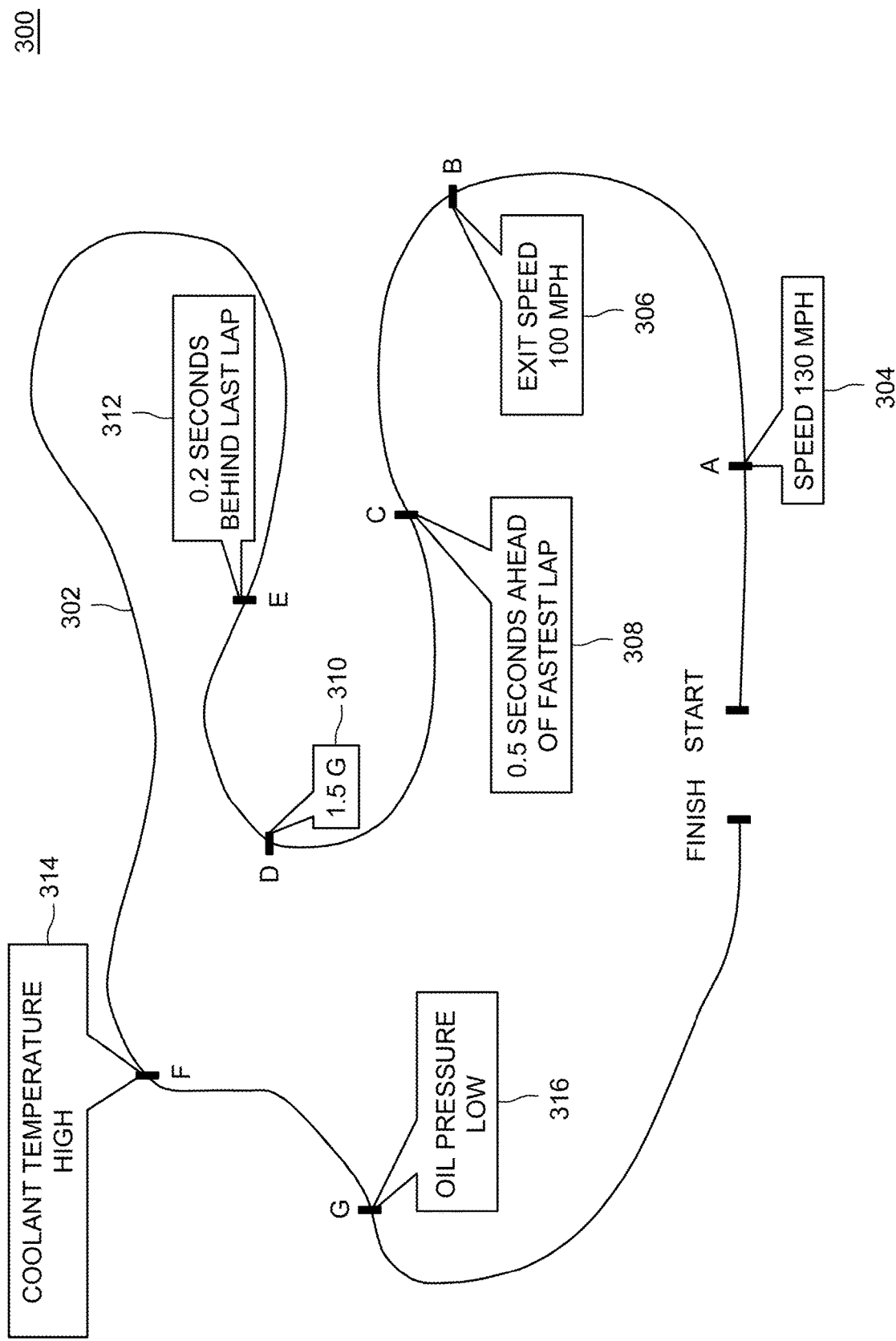
FIG. 4 is a diagram of a race track showing voice guidance generated by the apparatus of FIG. 1 or FIG. 2, and the method of FIG. 3, according to an embodiment of the invention.

FIG. 4 is a schematic diagram 300 of examples of voice guidance generated by the apparatus 100 of FIG. 1 or FIG. 2 and the method of FIG. 3, when the driver 20 drives the race car 10 on a race track 302, according to an embodiment of the invention. For example, the driver 20 or a coach of the driver 20 selects various parameters for guidance using the user interface, and may select entry speed at A, exit speed at B, lap time at C, G-force reading at D, and lap time at E, which is established as the guidance requested from the apparatus 100. The locations A, B, C, D and E on the race track are selectable using the user interface. The voice guidance system 120 receives the location information on the track, and the car status information, for example the speed, the G-force, elapsed time, engine coolant temperature, engine oil pressure, and the like from the race car data system 110. Based on the car location and the status information, the voice guidance system generates voice prompts (audio data) at such points according to the requested guidance. Therefore, when the voice guidance system 120 receives the information that the location of the car 10 corresponds to A, and that the car speed is 130 miles per hour, the voice guidance system generates an audio signal corresponding to "speed 130 miles per hour," which is announced to the driver via the audio actuator 30, as shown by the callout marked by numeral 304.

Similarly, at location B, the voice guidance system 120 receives the information that the speed is 100 miles per hour, the voice guidance system 120 announces to the driver, via the audio actuator 30 "exit speed 100 miles per hour," as shown by the callout marked by numeral 306. At location C, the voice guidance system 120 compares the elapsed time for reaching location C from the START with a previous fastest run for the same portion of the race track 302, and determines that the current run is 0.5 seconds faster. Accordingly, the voice guidance system 120 announces "0.5 seconds ahead of fastest lap," as shown by the callout marked by numeral 308. At location D, the voice guidance system 120 announces the current G-force loading of the car, as shown by the callout marked by numeral 310. At location E, in a manner similar to location C, the voice guidance system 120 identifies the difference between a current lap and a previous lap to reach the location E from the START location, and announces "0.2 seconds behind last lap," as shown by the callout marked by numeral 312. Those skilled in the art would readily appreciate that, in a manner as discussed above, the voice guidance system 120 may be configured to establish numerous other guidance using the user interface.

Such voice guidance can be configured to help keep the driver focused on what the driver may need to do to improve performance, while driving the race car on the race track, in a manner similar to a coach sitting in a co-passenger seat would prompt the driver. The voice guidance may also be established according to the proficiency level of the driver. Further, the voice guidance system 120 stores the location and the status information for later review (i.e., a post-run analysis), for example, by the driver 20 or the driver's coach, which may assist in in-depth analysis of the driver's performance and suggesting improvements. For example, post-run analyses includes times to achieve 0-60 miles per hour, or 0-100 miles per hour, entry speeds in specific sections of the track, exit speed from specific sections of the track, lap times, top speed, split times, brake points, amount of coasting, corner g-force, among several others. Simply stated, any performance or operational data point collected during the on-track experience may be the subject of post-run analysis. Such data may be selectably presented in tables, overlaid upon a track map, and/or accompanied by in-car video.

Additionally, when the voice guidance system 120 receives critical and/or abnormal status information from the race car data system 110, for example, if the coolant temperature is too high, or if the engine pressure is too low, such as that at locations F and G, the voice guidance system 120 announces such status information to the driver, for example, as shown by the callouts marked by numerals 314 and 316, respectively. Usually, a race car's data system presents a significant amount of information regarding the car's systems, and at high speeds, a driver may inadvertently ignore an abnormality or critical status information. However, a voice prompt can timely bring the criticality or abnormality to the driver's attention, based on which the driver may take a corrective action, saving the car from potential damage.

The methods described herein may be implemented in software, hardware, or a combination thereof, in different embodiments. The methods may be incorporated in processor executable instructions stored on non-transitory computer readable media. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for generating voice guidance in a race vehicle, while the race vehicle is racing on a race track, the method comprising:
   connecting a voice guidance system (VGS) to a data system of a race vehicle, where the connection provides access to vehicle status information comprising at least one race vehicle parameter;
   prior to racing, temporarily connecting a computer to a user interface module of the VGS;
   displaying on the computer, while connected to the VGS prior to racing, a user interface comprising selectable points on the race track and a list of guidance data options;
   selecting, through manipulation of the user interface, at least one point on the race track at which at least one race vehicle parameter is to be annunciated;
   selecting, through manipulation of the user interface, at least one guidance data option from the list of guidance data options that identifies at least one race vehicle parameter to be annunciated when the race vehicle location is at the selected at least one point;
   storing the selected at least one point and selected guidance data option in the VGS;
   disconnecting the computer from the user interface module of the VGS before racing on the race track;
   while racing on the race track, the VGS performs:
   a. determining a location of the race vehicle;
   b. determining that the race vehicle is located at the selected at least one point;
   c. at the selected at least one point, accessing the selected at least one race vehicle parameter from the data system that corresponds to the selected at least one guidance data option;
   d. converting the accessed selected at least one race vehicle parameter into an audio signal; and
   e. annunciating, through an audio actuator positioned within a driver's race helmet, the audio signal at the selected at least one point as voice guidance for the driver.

2. The method of claim 1, wherein the at least one race vehicle parameter comprises at least one of speed, acceleration, time elapsed, g-force, steering angle, throttle position, brake position, brake displacement, coolant temperature, oil pressure, rotations per minute (RPM), or aerodynamics, while the race vehicle is racing on the race track.

3. The method of claim 1, wherein the vehicle status information is further based on at least one of a race track information, previous racing performance information of the race vehicle on the race track, or previous racing performance information a driver of the race vehicle on the race track.

4. The method of claim 3, wherein the selected at least one race vehicle parameter is lap time comparison at the selected at least one point on the race track.

5. The method of claim 1, wherein the list of guidance data options include at least one of speed at particular locations on the race track, g-force at particular locations on the race track, engine status, elapsed time, braking information, corner speed, turn-in speed, or exit speed.

6. The method of claim 1, wherein the selected at least one guidance data option is speed at the selected at least one point on the race track, and wherein the vehicle status information comprises the speed of the race vehicle on the race track.

7. An apparatus for generating voice guidance in a race vehicle, while the race vehicle is racing on a race track, the apparatus comprising:
   a race vehicle data system for generating race vehicle status information comprising at least one race vehicle parameter;
   a voice guidance system (VGS), adapted to be coupled to the data, comprising a user interface module and a guidance module, where the VGS stores a selected at least one guidance data option, a selected at least one point on the race track and race vehicle status information, where the guidance module converts race vehicle status information into an audio signal in accordance with a location of the race vehicle, the selected at least one guidance data option and the selected at least one point on the race track;

a computer that, prior to racing, is temporarily connected to the user interface module of the VGS, where the computer comprises a user interface comprising selectable points on the race track and a list of guidance data options, where the user interface enables: (1) selection of at least one point on the race track at which at least one race vehicle parameter is to be annunciated and (2) selection of at least one guidance data option that identifies at least one race vehicle parameter to be annunciated when the race vehicle is located at the selected at least one point, the computer stores the selected at least one point and selected guidance data option in the VGS; and an audio actuator located in a helmet of a driver of the race vehicle and communicably coupled to the VGS, the audio actuator configured to annunciate a voice prompt based on the audio signal while the race vehicle is racing on the race track.

8. The apparatus of claim 7, wherein the at least one race vehicle parameter comprises speed, acceleration, time elapsed, g-force, steering angle, throttle position, brake position, brake displacement, temperature, pressure, or aerodynamics, while the race vehicle is racing on the race track.

9. The apparatus of claim 7, wherein the VGS is configured to determine the race vehicle status information further based on at least one of a race track information, previous racing performance information of the race vehicle on the race track, or previous racing performance information a driver of the race vehicle on the race track.

10. The apparatus of claim 7, wherein the selected at least one race vehicle parameter is lap time comparison at the selected at least one point on the race track.

11. The apparatus of claim 7, wherein the user interface presents a selectable list of guidance data options comprising at least one of speed at particular locations on the race track, g-force at particular locations on the track, engine status, elapsed time, braking information, corner speed, turn-in speed, or exit speed.

12. The apparatus of claim 7, wherein the selected at least one guidance data option is speed at the selected at least one point on the race track, and wherein the identified at least one race vehicle parameter comprises the speed of the race vehicle at the selected at least one point on the race track.

13. An apparatus for generating voice guidance in a race vehicle, while the race vehicle is racing on a race track, the apparatus comprising:

a voice guidance system (VGS), adapted to be coupled to a data system of the race vehicle for providing race vehicle status information comprising at least one race vehicle parameter, comprising a user interface module and a guidance module, where the VGS stores a selected at least one guidance data option, a selected at least one point on the race track and race vehicle status information, where the guidance module converts race vehicle status information into an audio signal in accordance with a location of the race vehicle, the selected at least one guidance data option and the selected at least one point on the race track;

a user interface containing a track map and a list of guidance data options, where the user interface displays selectable points on the race track and a list of guidance data options and enables: (1) selection of at least one point on the race track at which at least one race vehicle parameter is to be annunciated and (2) selection of at least one guidance option that identifies at least one race vehicle parameter to be annunciated when the race vehicle is located at the selected at least one point; and an audio actuator located in a helmet of a driver of the race vehicle and communicably coupled to the VGS, the audio actuator configured to annunciate a voice prompt based on the audio signal while the race vehicle is racing on the race track.

14. The apparatus of claim 13, wherein the selected at least one guidance data option is speed at the selected at least one point on the race track, and wherein the annunciated race vehicle status information comprises the speed of the race vehicle at the selected at least one point on the race track.

* * * * *